(12) United States Patent
Ohba (10) Patent No.: US 7,932,752 B2
(45) Date of Patent: Apr. 26, 2011

(54) CORRELATED DOUBLE SAMPLING CIRCUIT AND SAMPLE HOLD CIRCUIT

(75) Inventor: Makoto Ohba, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/090,310

(22) PCT Filed: Oct. 27, 2006

(86) PCT No.: PCT/JP2006/321548
§ 371 (c)(1),
(2), (4) Date: Mar. 25, 2009

(87) PCT Pub. No.: WO2007/055114
PCT Pub. Date: May 18, 2007

(65) Prior Publication Data
US 2009/0219058 A1    Sep. 3, 2009

(30) Foreign Application Priority Data

Nov. 8, 2005    (JP) ................................ 2005-323386

(51) Int. Cl.
*G11C 27/02* (2006.01)
*H03K 5/00* (2006.01)
*H03K 17/00* (2006.01)

(52) U.S. Cl. ......................................... 327/94; 327/337

(58) Field of Classification Search .............. 327/94–96, 327/336, 337
See application file for complete search history.

(56) References Cited

U.S. PATENT DOCUMENTS

| 5,912,703 | A | 6/1999 | Tamayama |
| 6,009,129 | A | 12/1999 | Kenney et al. |
| 6,850,278 | B1 | 2/2005 | Sakurai et al. |
| 7,075,471 | B1* | 7/2006 | Gupta ............................ 341/155 |
| 7,554,584 | B2 | 6/2009 | Lim |
| 2004/0239783 | A1 | 12/2004 | Imaizumi et al. |
| 2005/0209803 | A1 | 9/2005 | Yamaguchi |
| 2008/0074521 | A1* | 3/2008 | Olsen ............................ 348/300 |
| 2010/0007390 | A1* | 1/2010 | Yeh ............................... 327/158 |

FOREIGN PATENT DOCUMENTS

| CN | 1194556 | 9/1998 |
| CN | 1681290 | 10/2005 |
| JP | 4-126477 | 4/1992 |
| JP | 5-68210 | 3/1993 |

(Continued)

OTHER PUBLICATIONS

Chinese Office Action issued in Patent Application No. CN 2006800417831, mailed Jul. 3, 2009.

(Continued)

*Primary Examiner* — Lincoln Donovan
*Assistant Examiner* — Diana J Cheng
(74) *Attorney, Agent, or Firm* — McDermott Will & Emery LLP (57) ABSTRACT

A correlated double sampling circuit has a sampling capacitor equally divided into a plurality of portions. In the correlated double sampling circuit, an input signal is sampled at a plurality of sampling points and an averaging switch is closed to obtain an average value of a plurality of sampling values obtained by sampling. High frequency noise superimposed on the input signal is thus reduced and a difference between the average values of the plurality of sampling values obtained by sampling is output.

7 Claims, 12 Drawing Sheets

FOREIGN PATENT DOCUMENTS

| | | |
|---|---|---|
| JP | 6-98227 | 4/1994 |
| JP | 10-191169 | 7/1998 |
| JP | 2000-165754 | 6/2000 |
| JP | 2003-37780 | 2/2003 |
| JP | 2003-511920 | 3/2003 |
| JP | 2003-334794 | 11/2003 |
| JP | 2004-357059 | 12/2004 |
| JP | 2005-151081 | 6/2005 |
| JP | 2005-167790 | 6/2005 |
| JP | 2005-269215 | 9/2005 |
| JP | 2005-277709 | 10/2005 |
| JP | 2005-269646 | 9/2006 |
| WO | WO 01/026382 A1 | 4/2001 |

OTHER PUBLICATIONS

Japanese Office Action, with English translation, issued in Japanese Patent Application No. 2007-544095, mailed May 18, 2010.

Japanese Office Action, with English translation, issued in Japanese Patent Application No. 2007-544095, mailed Dec. 7, 2010.

* cited by examiner

CORRELATED DOUBLE SAMPLING CIRCUIT AND SAMPLE HOLD CIRCUIT

RELATED APPLICATIONS

This application is the U.S. National Phase under 35 U.S.C. §371 of International Application No. PCT/JP2006/321548, filed on Oct. 27, 2006, which in turn claims the benefit of Japanese Application No. 2005-323386, filed on Nov. 8, 2005, the disclosures of which Applications are incorporated by reference herein.

TECHNICAL FIELD

The invention relates to a correlated double sampling circuit and a sample hold circuit.

BACKGROUND ART

Conventionally, an analog image signal processing circuit such as a mobile phone camera and a digital still camera generally uses a single-ended structure and a differential structure in order to remove common mode noise such as disturbance. An output signal of an image sensor such as a CCD (Charge Coupled Device) and a CMOS (Complementary Metal-Oxide Semiconductor) sensor is sampled by a correlated double sampling circuit and then transmitted to an amplifier of a subsequent stage.

In recent image sensors having improved resolution and higher read frequency, high quality image signal processing is difficult due to degraded S/N (Signal-to-Noise ratio) when high frequency noise is superimposed on a sensor output signal.

Figure 7:
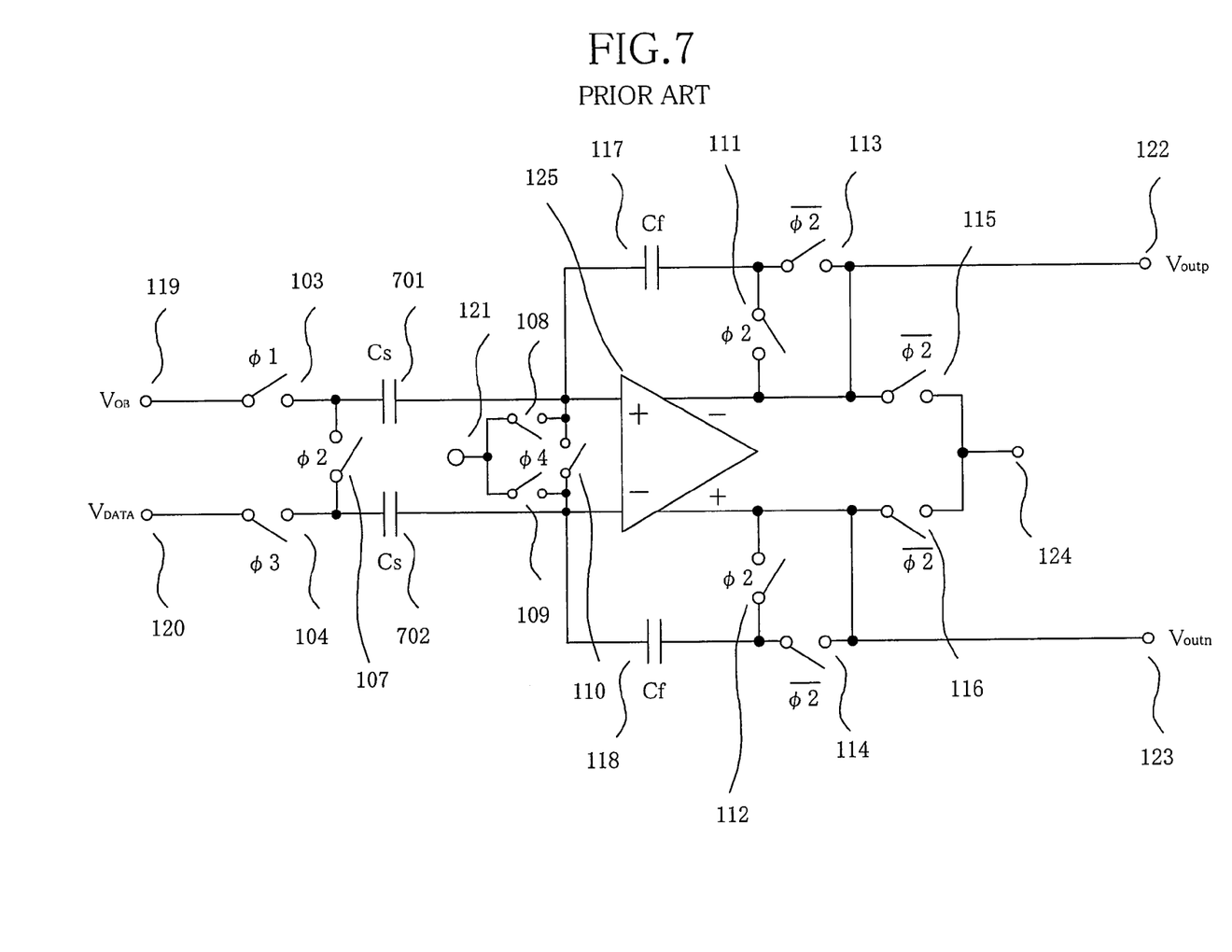
FIG. 7 shows a structure of a conventional correlated double sampling circuit.
Figure 8:
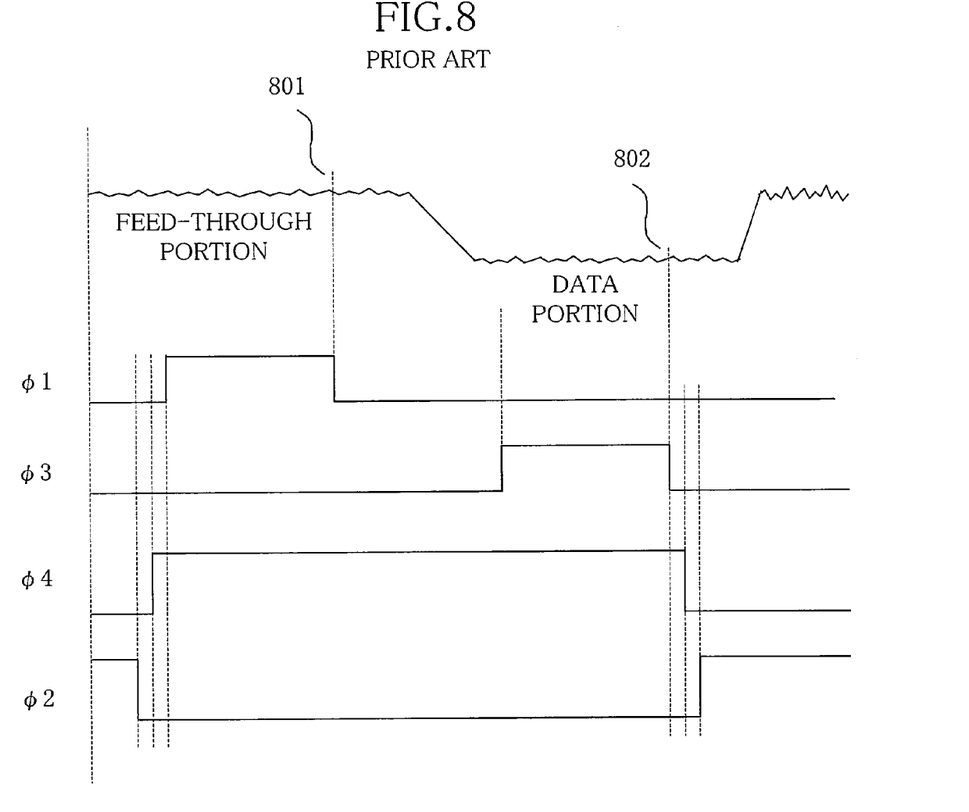
FIG. 8 is a timing chart of the conventional correlated double sampling circuit.

FIG. 7 shows a structure of a conventional correlated double sampling circuit. FIG. 8 is a timing chart of the conventional correlated double sampling circuit.

In FIG. 7, 103, 104, and 107 through 116 indicate switch elements, 117 and 118 indicate feedback capacitors, 119 and 120 indicate input terminals, 122 and 123 indicate output terminals, 125 indicates an operational amplifier, 121 indicates an input terminal, 124 indicates an output terminal, and 701 and 702 indicate sampling capacitors.

As shown in FIG. 7, a voltage $V_{OB}$ of a feed-through portion of an image sensor output signal is applied to an input terminal 119, and a voltage $V_{Data}$ of a data portion of the image sensor output signal is applied to an input terminal 120. As shown in FIG. 8, the feed-through portion is sampled at a sampling point 801 and the data portion is sampled at a sampling point 802.

In the case where high frequency noise is superimposed on the image sensor output signal, an output voltage $\Delta V_o$ of the correlated double sampling circuit is shown by the following formula (1), where $\Delta V_{OB}$ is a high frequency noise level of the feed-through portion at the sampling point 801, $\Delta V_{Data}$ is a high frequency noise level of the data portion at the sampling point 802, $V_{outp}$ is a voltage at an output terminal 122, $V_{outn}$ is a voltage at an output terminal 123, $C_s$ is a capacitance value of sampling capacitors 701 and 702, and $C_f$ is a capacitance value of feedback capacitors 117 and 118:

[Formula 1]

$$\Delta V_o = V_{outn} - V_{outp} = \frac{C_s}{C_f} \left\{ \begin{array}{l} (V_{Data} - V_{OB}) + \\ (\Delta V_{Data} - \Delta V_{OB}) \end{array} \right\}. \quad (1)$$

It can be seen from the formula (1) that the high frequency noise level $\Delta V_{OB}$ of the feed-through portion of the image sensor output signal and the high frequency noise level $\Delta V_{Data}$ of the data portion of the image sensor output signal are multiplied by $C_s/C_f$ and S/N is degraded.

Patent document 1 discloses a method for reducing high frequency noise of an image sensor output signal by inserting a low pass filter between an image sensor and a correlated double sampling circuit.

Patent document 2 discloses a method for reducing a high frequency noise level of a sensor signal by increasing the number of sampling circuits. A sensor signal is thus sampled at a plurality of sampling points and an average value of a plurality of sampling values obtained by the sampling is obtained, whereby a high frequency noise level is reduced.

Patent document 1: Japanese Laid-Open Patent Publication No. 5-68210

Patent document 2: Japanese Laid-Open Patent Publication No. 2005-167790

DISCLOSURE OF THE INVENTION

Problems to be Solved by the Invention

As described above, S/N is degraded in the case where high frequency noise is superimposed on an image sensor output signal. Therefore, high frequency noise is reduced by adding a low pass filter or increasing the number of sampling circuits in the above examples. However, the circuit size and power consumption are increased as compared to the conventional structure.

The invention is made in view of the above problems and it is an object of the invention to provide a correlated double sampling circuit capable of improving S/N by reducing noise superimposed on an output signal of an image sensor while suppressing increase in circuit size and power consumption.

Means for Solving the Problems

In a correlated double sampling circuit according to the invention, a sampling capacitor is equally divided into N portions (where N is an integer of at least 2) so that a feed-through portion of an image sensor output signal is sampled at N sampling points (where N is an integer of at least 2). The N portions of the sampling capacitor are connected in parallel with each other by an averaging switch, whereby an average value of a plurality of sampling values obtained by sampling is calculated.

A data portion of the image sensor output signal is also sampled at N sampling points. The N portions of the sampling capacitor are connected in parallel with each other, whereby an average value of a plurality of sampling values obtained by sampling is calculated.

A high frequency noise level can thus be reduced. The averaging switch is added in order to calculate an average value of a plurality of sampling values obtained by the equally divided N portions of the sampling capacitor (where N is an integer of at least 2). Since the size of a sampling switch can be reduced to 1/N, the circuit area is almost the same as the conventional example. Moreover, since no other circuit is added, power consumption is not increased.

The correlated double sampling circuit of the invention further includes a clock circuit for variably controlling a sampling frequency for sampling at a plurality of sampling points. Since the sampling frequency is variably controlled, filter characteristics of the correlated double sampling circuit can be variably changed and a frequency band to be reduced can be variable changed.

Effects of the Invention

As has been described above, a correlated double sampling circuit according to the invention is capable of reducing high frequency noise superimposed on an image sensor output signal while suppressing increase in circuit size and power consumption.

DESCRIPTION OF THE REFERENCE NUMERALS 101 sampling capacitor
102 sampling capacitor
103 sampling switch
104 sampling switch
105 averaging switch
106 averaging switch
119 signal input terminal for a feed-through portion
120 signal input terminal for a data portion
122 output terminal of a correlated double sampling circuit
123 output terminal of a correlated double sampling circuit
301 sampling point of a feed-through portion
302 sampling point of a feed-through portion
303 sampling point of a data portion
304 sampling point of a data portion
401 sampling switch
402 averaging switch
403 sampling capacitor
406 voltage follower
407 sample hold circuit
601 correlated double sampling circuit
602 clock circuit
605 noise detection circuit
606 noise comparison circuit
904 sample hold circuit

BEST MODE FOR CARRYING OUT THE INVENTION

Hereinafter, embodiments of the invention will be described in detail with reference to the accompanying drawings. The following description of preferred embodiments is essentially given by way of example only and does not intend to limit the invention or its applications or usages.

First Embodiment

Figure 1:
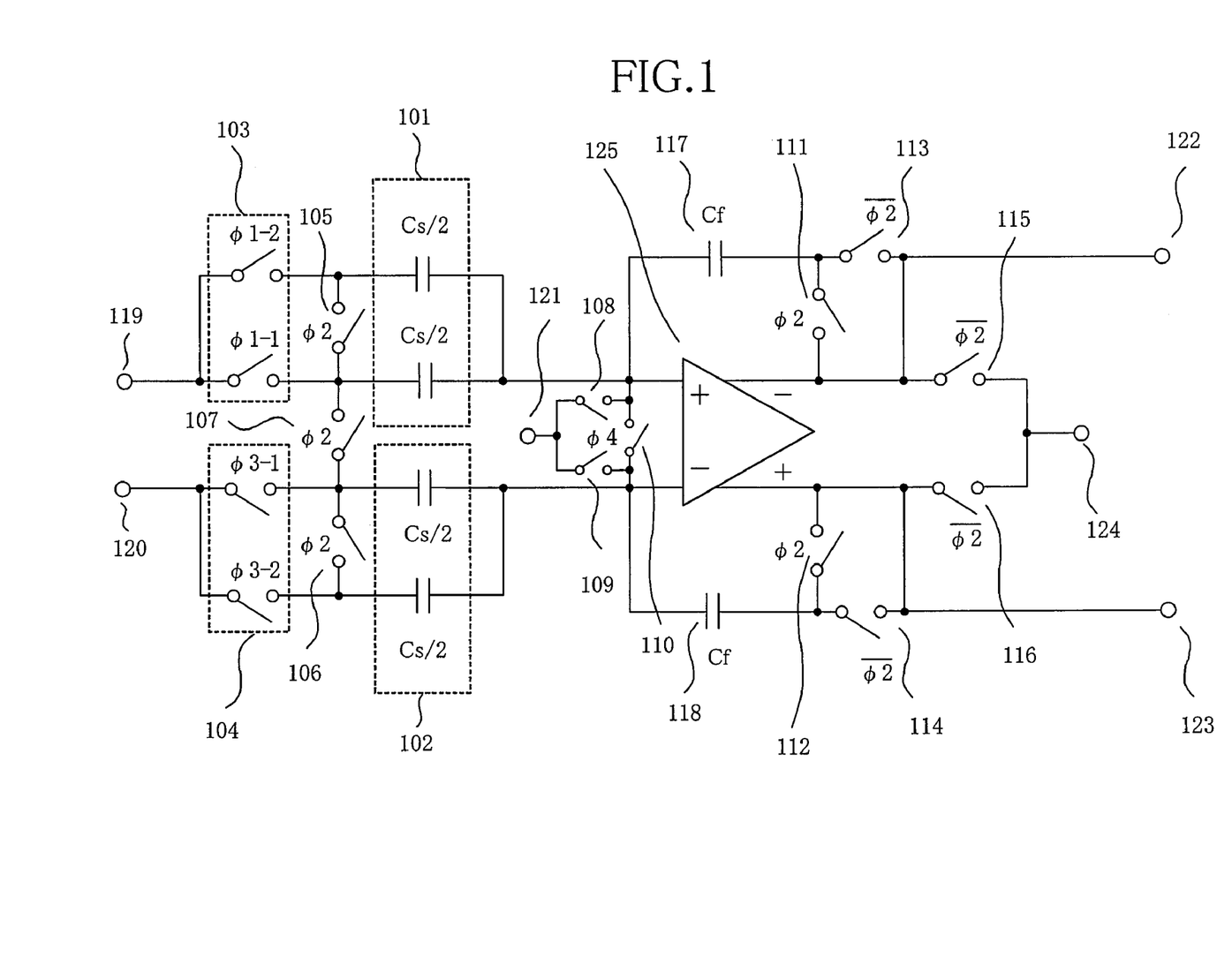
FIG. 1 shows a structure of a correlated double sampling circuit according to a first embodiment of the invention.

FIG. 1 shows a structure of a correlated double sampling circuit according to a first embodiment of the invention. It is herein assumed that each sampling capacitor in the correlated double sampling circuit is equally divided into two portions.

In FIGS. 1, 101 and 102 indicate sampling capacitors, 103, 104, and 107 through 116 indicate switch elements, 117 and 118 indicate feedback capacitors, 119 and 120 indicate input terminals, 122 and 123 indicate output terminals, 125 indicates an operational amplifier, 121 indicates an input terminal, and 124 indicates an output terminal.

As shown in FIG. 1, a signal of a feed-through portion of an image sensor output signal is applied to an input terminal 119 of the correlated double sampling circuit, and a signal of a data portion of the image sensor output signal is applied to an input terminal 120 of the correlated double sampling circuit.

Each sampling capacitor 101, 102 is equally divided into two portions, and a capacitance value of each portion is Cs/2.

Figure 2:
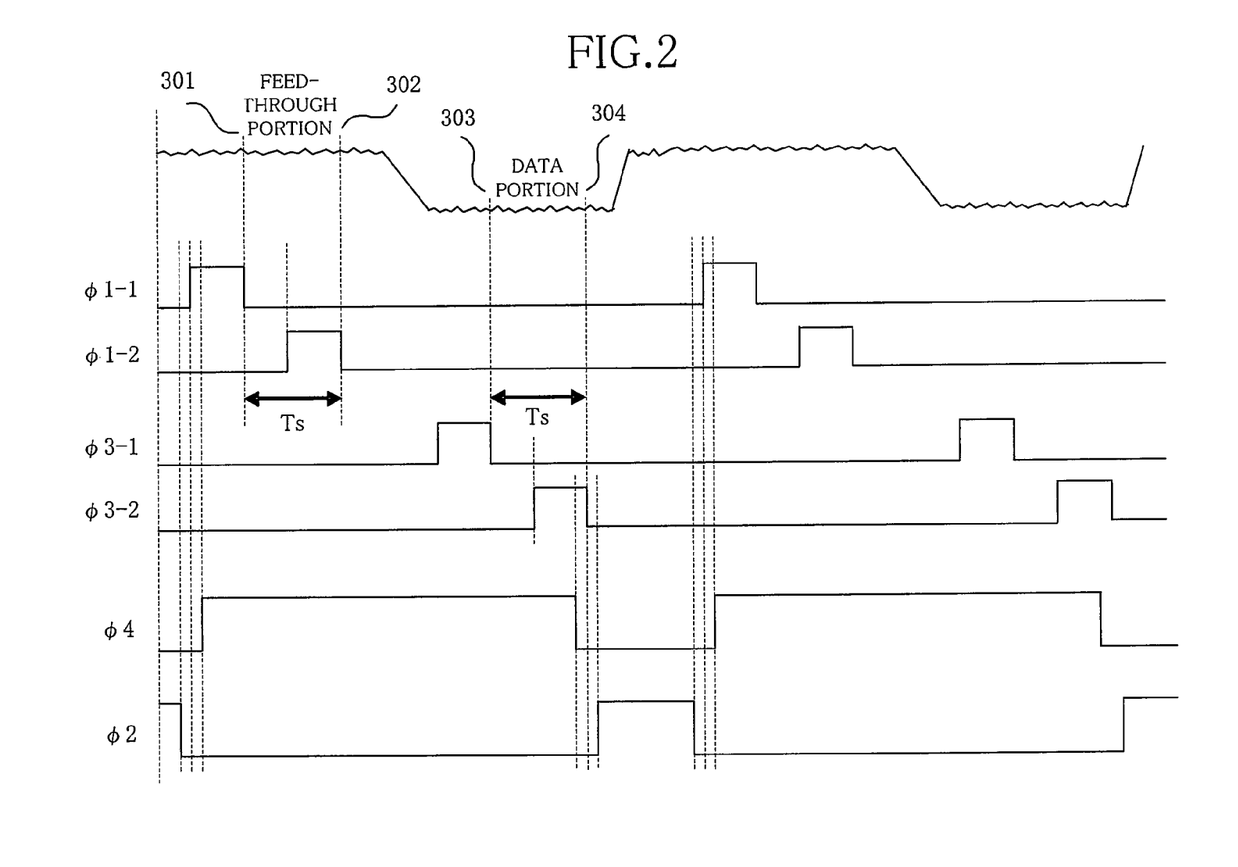
FIG. 2 is a timing chart of the correlated double sampling circuit according to the first embodiment.

FIG. 2 is a timing chart of the correlated double sampling circuit according to the first embodiment. As shown in FIG. 2, a sampling switch 103 provided corresponding to the number of divided portions of the sampling capacitor 101 is closed and the feed-through portion of the image sensor output signal is sampled at sampling points 301 and 302. A sampling switch 104 provided corresponding to the number of divided portions of the sampling capacitor 102 is then closed and the data portion of the image sensor output signal is sampled at sampling points 303 and 304.

Averaging switches 105 and 106 are then closed and an average value of the sampling values obtained at the sampling points 301, 302 and an average value of the sampling values obtained at the sampling points 303, 304 are calculated.

After the average values of the sampling values are calculated, the correlated double sampling circuit outputs a difference between the average value of the sampling values of the feed-through portion and the average value of the sampling values of the data portion. A sampling frequency fs is herein 1/Ts.

In the case where high frequency noise is superimposed on the image sensor output signal, an output voltage $\Delta V_o$ of the correlated double sampling circuit is shown by the following formula (2), where $V_{OB}+\Delta V_{OB1}$ is a voltage of the feed-through portion at the sampling point 301, $V_{OB}+\Delta V_{OB2}$ is a voltage of the feed-through portion at the sampling point 302, $V_{Data}+\Delta V_{Data1}$ is a voltage of the data portion at the sampling point 303, $V_{Data}+\Delta V_{Data2}$ is a voltage of the data portion at the sampling point 304, $V_{outp}$ is a voltage at the output terminal 122, $V_{outn}$ is a voltage at the output terminal 123, and $C_f$ is a capacitance value of feedback capacitors 117, 118:

[Formula 2]

$$\Delta V_o = V_{outn} - V_{outp} = \frac{C_s}{C_f}\left\{(V_{Data} - V_{OB}) + \left(\frac{\Delta V_{Data1} + \Delta V_{Data2}}{2} - \frac{\Delta V_{OB1} + \Delta V_{OB2}}{2}\right)\right\}. \quad (2)$$

It can be seen from the formula (2) that, since a high frequency noise level of the image sensor output signal varies depending on the sampling points, the high frequency noise level can be reduced to one half of the conventional value by varying a sampling frequency 1/Ts and/or a sampling point and performing sampling at an optimal sampling point at which the high frequency noise level is the lowest.

Hereinafter, another structure of the correlated double sampling circuit will be described with reference to FIG. 3. In this structure, each sampling capacitor is equally divided into N portions (where N is an integer of at least 2).

Figure 3:
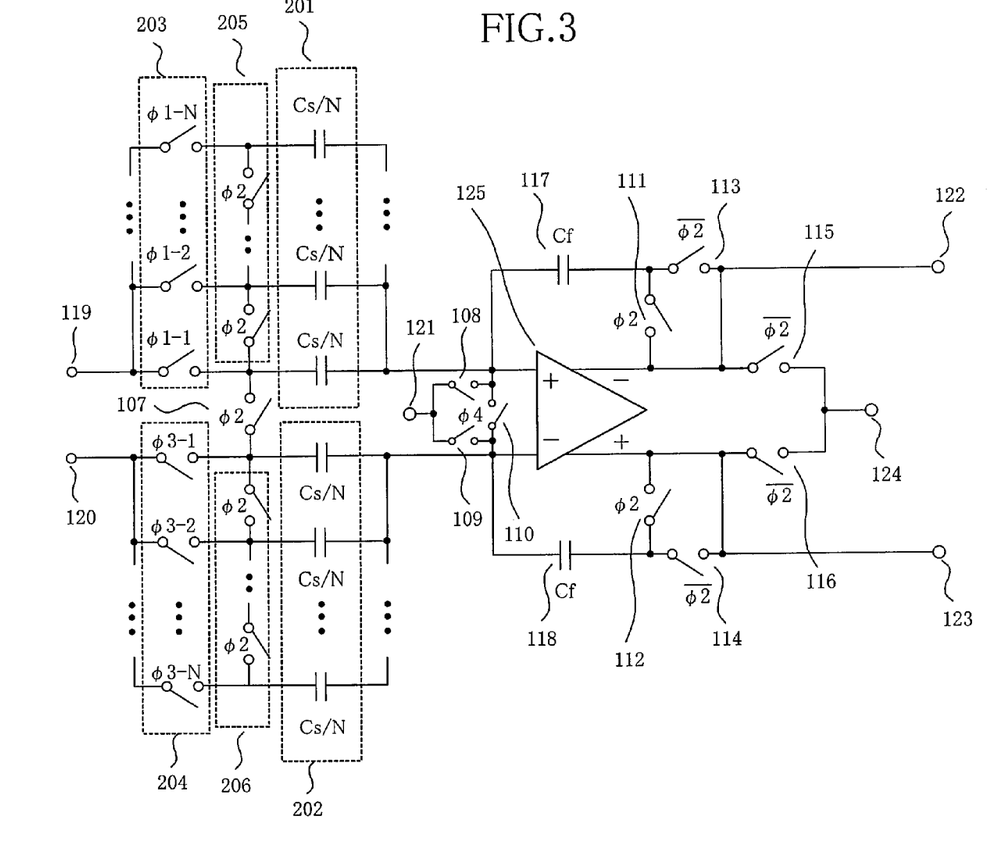
FIG. 3 shows another structure of the correlated double sampling circuit according to the first embodiment.

As shown in FIG. 3, each sampling capacitor 201, 202 is equally divided into N portions and a capacitance value of each portion is Cs/N. Sampling switches 203, 204 and averaging switches 205, 206 are provided corresponding to the number of divided portions of the sampling capacitors 201, 202, respectively.

In the case where high frequency noise is superimposed on an image sensor output signal, an output voltage $\Delta V_o$ of the correlated double sampling circuit is shown by the following formula (3):

[Formula 3]

$$\Delta V_o = V_{outn} - V_{outp} = \frac{C_s}{C_f}\left\{(V_{Data} - V_{OB}) + \frac{1}{N} \cdot \left(\sum_{n=1}^{N} \Delta V_{Datan} - \sum_{n=1}^{N} \Delta V_{OBn}\right)\right\}. \quad (3)$$

It can be seen from the formula (3) that, since a high frequency noise level of the image sensor output signal varies depending on the sampling points, the high frequency noise level can be reduced to 1/N of the conventional value by varying a sampling frequency 1/Ts and/or a sampling point and performing sampling at an optimal sampling point at which the high frequency noise level is the lowest.

As has been described above, in the correlated double sampling circuit of the first embodiment, a high frequency noise level is reduced by dividing each sampling capacitor 101, 102 as required. Since each sampling capacitor 101, 102 is merely equally divided into N portions, a high frequency noise level superimposed on an image sensor output signal can be reduced to 1/N while suppressing increase in circuit size and power consumption.

Note that, in the first embodiment, each sampling capacitor 101, 102 is equally divided into N portions. However, the invention is not limited to equally dividing each sampling capacitor, and each sampling capacitor may be divided into a plurality of portions.

Second Embodiment

Figure 4:
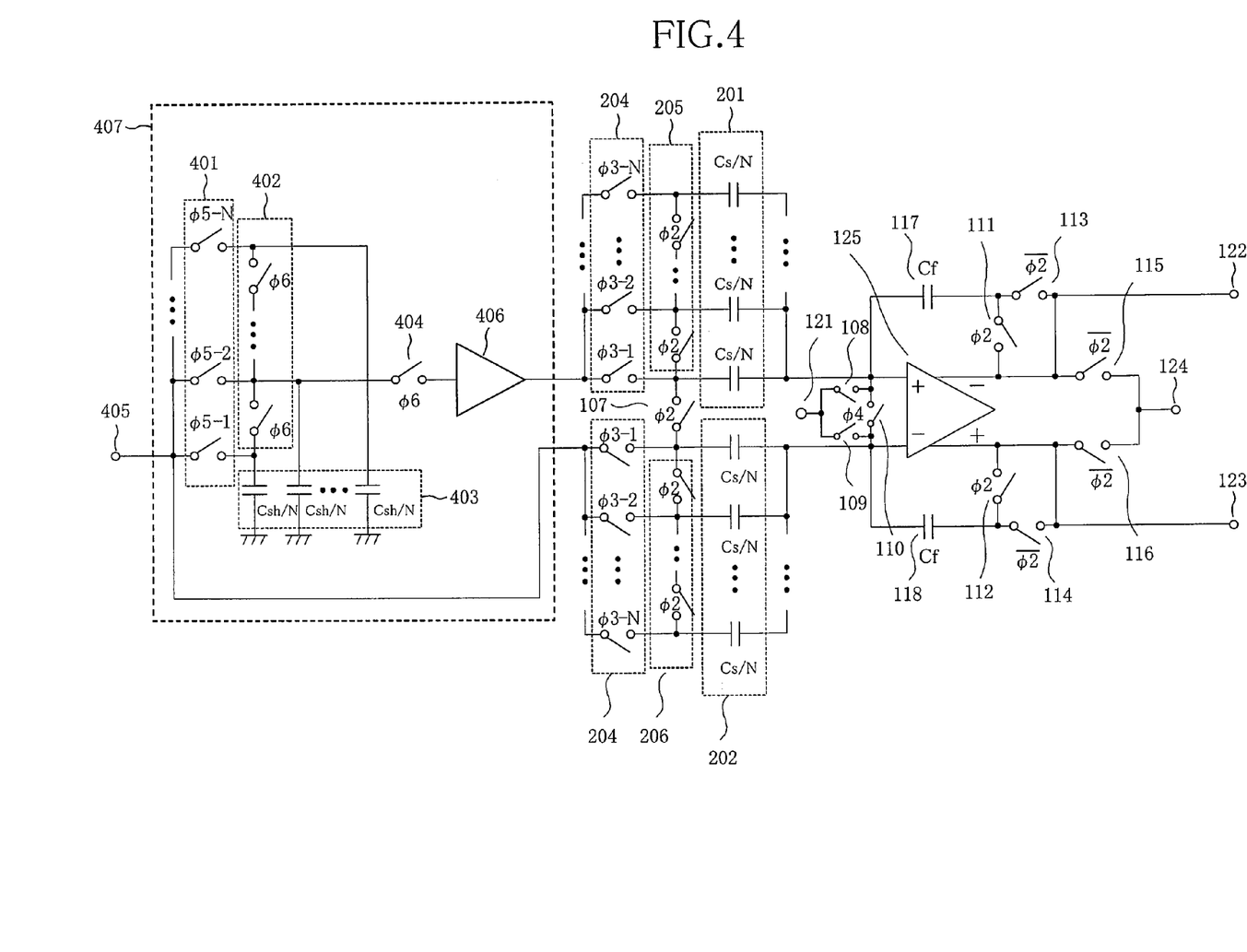
FIG. 4 shows a structure of a correlated double sampling circuit according to a second embodiment.
Figure 9:
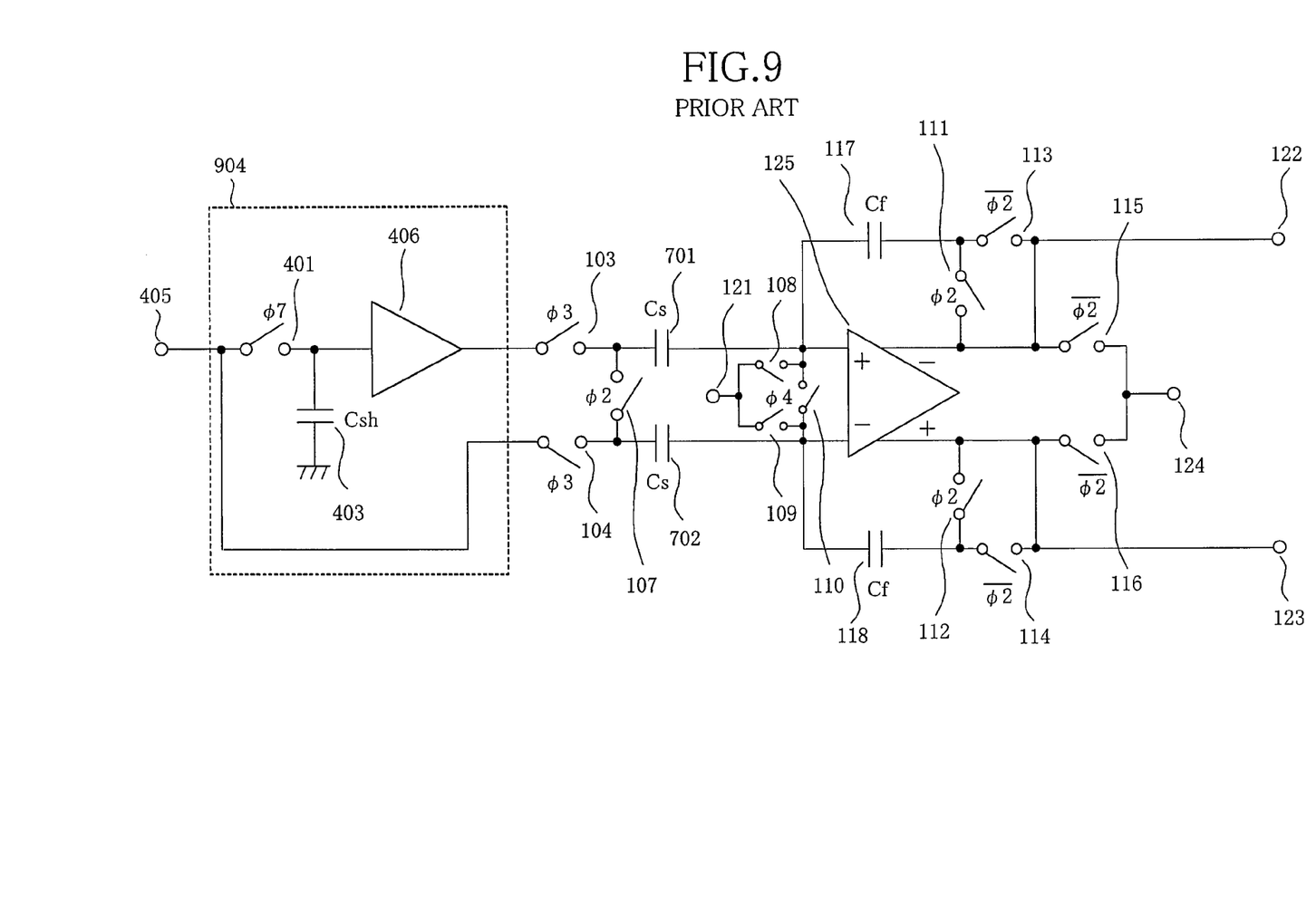
FIG. 9 shows another structure of the conventional correlated double sampling circuit.

FIG. 4 shows a structure of a correlated double sampling circuit according to a second embodiment of the invention. The correlated double sampling circuit of FIG. 4 is obtained by applying characteristics of the invention to a conventional correlated double sampling circuit having a sample hold circuit 904 on the side of sampling a feed-through portion of an image sensor output signal as shown in FIG. 9. In other words, the correlated double sampling circuit of FIG. 4 is obtained by applying a method of equally dividing each sampling capacitor into N portions (where N is an integer of at least 2) to the conventional correlated double sampling circuit of FIG. 9.

As shown in FIG. 4, a sampling capacitor 403 of a sample hold circuit 407 is equally divided into N portions (where N is an integer of at least 2), and a capacitance value of each portion is Csh/N. In FIG. 4, 401 indicates a sampling switch, 404 indicates a switch element, 405 indicates an input terminal, and 406 indicates a voltage follower for amplifying an average value of voltages sampled at a plurality of sampling points with a gain of one time.

By closing an averaging switch 402 provided corresponding to the number of divided portions of the sampling capacitor 403, an average value of a plurality of sampling values of a feed-through portion obtained by sampling is calculated. A signal of a data portion is sampled at N times by a sampling capacitor 202.

In order to retain the differential property of the circuit, a sampling capacitor 201 of the correlated double sampling circuit in FIG. 4 samples again the average value of the sampling values of the feed-through portion obtained by sampling by the sample hold circuit 407. The sampling capacitor 201 is equally divided into N portions. The sampling capacitor 202 is also equally divided into N portions.

The subsequent processing is the same as in the first embodiment, and an output voltage $\Delta V_o$ of the correlated double sampling circuit is shown by the above formula (3).

Figure 5:
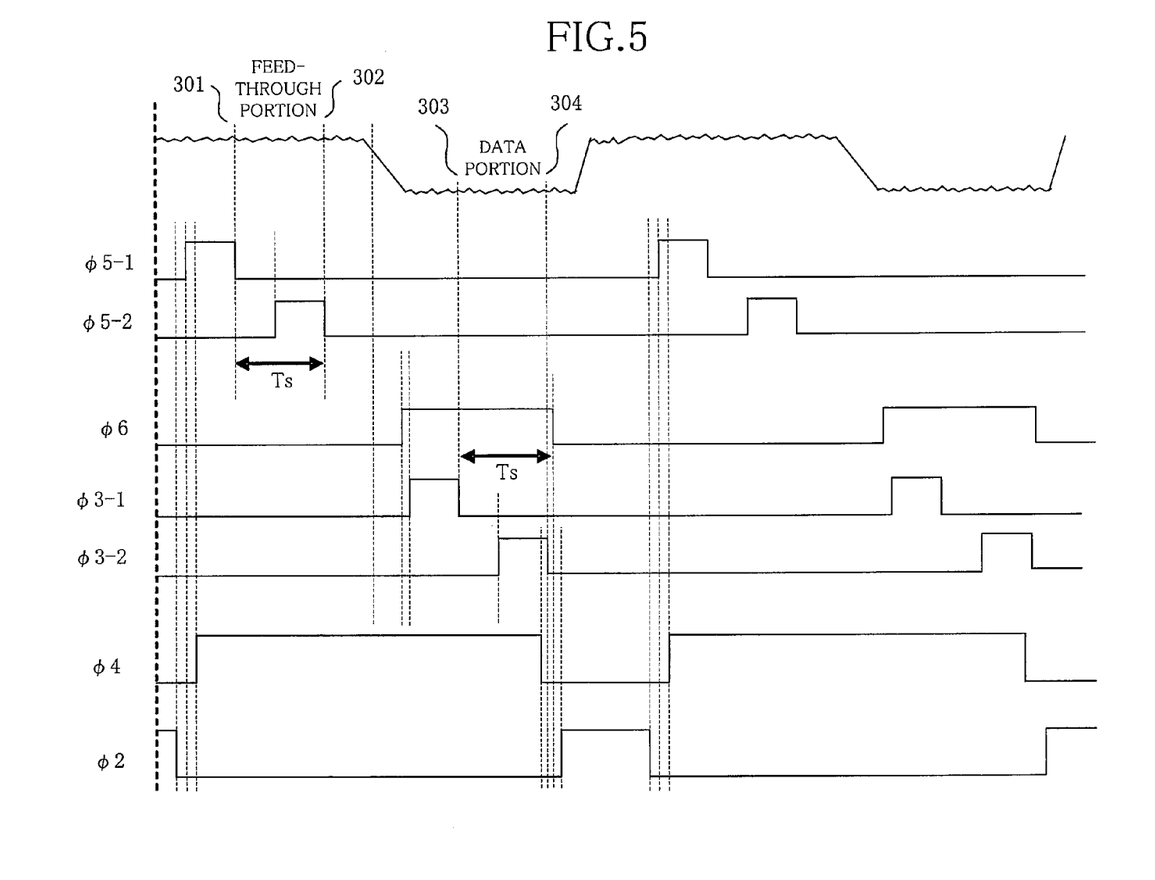
FIG. 5 is a timing chart of the correlated double sampling circuit (N=2) according to the second embodiment.

FIG. 5 is a timing chart of the correlated double sampling circuit of the second embodiment. It is herein assumed that each sampling capacitor in the correlated double sampling circuit is equally divided into two portions.

In the correlated double sampling capacitor of the second embodiment as well, it can be seen from the formula (3) that, since a high frequency noise level of an image sensor output signal varies depending on the sampling points, the high frequency noise level can be reduced to 1/N of the conventional value by varying a sampling frequency 1/Ts and/or a sampling point and performing sampling at an optimal sampling point at which the high frequency noise level is the lowest.

Figure 6:
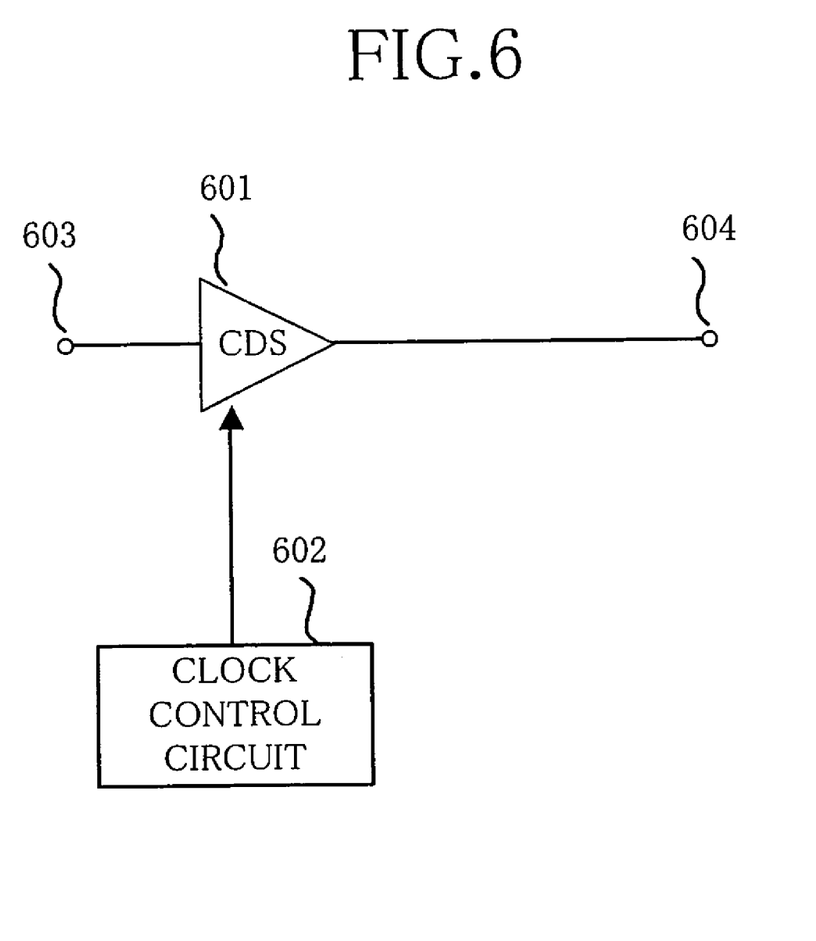
FIG. 6 shows a structure of the correlated double sampling circuit of the first or second embodiment additionally including a clock circuit.

FIG. 6 shows a structure of a correlated double sampling circuit 601 of the first or second embodiment additionally including a clock circuit 602 for variably controlling the sampling frequency 1/Ts for performing sampling at a plurality of sampling points.

As shown in FIG. 6, by variably controlling the sampling frequency 1/Ts by the clock circuit 602, filter characteristics of the correlated double sampling circuit 601 can be variably changed and a frequency band to be reduced can be variably changed. In FIG. 6, 603 indicates an input terminal and 604 indicates an output terminal.

Figure 10:
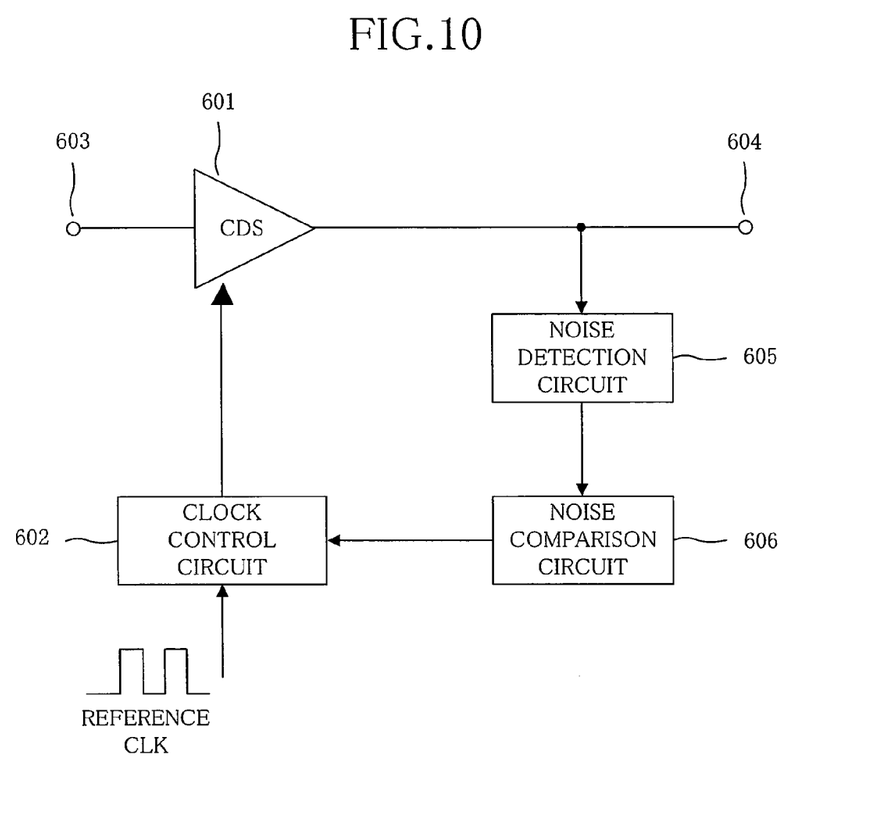
FIG. 10 shows a circuit structure in the case where a sampling frequency is variably controlled.

FIG. 10 is an example of a circuit structure for feedback adjusting a clock timing in order to realize optimization of a sampling point. Based on the above formula (3), a noise voltage of an output signal of the correlated double sampling circuit 601 is shown by the following formula (4):

[Formula 4]

$$V_{noise}(f_n) = \frac{C_s}{C_f} \cdot \frac{1}{N} \cdot \left( \sum_{n=1}^{N} \Delta V_{Datan} - \sum_{n=1}^{N} \Delta V_{OBn} \right). \tag{4}$$

∗ $f_n$: sampling frequency

The sampling frequency $f_n$ is changed by changing a dividing ratio of a PLL (Phase-locked loop) in the clock control circuit 602. The PLL synchronizes an output signal of a voltage controlled oscillator (VCO) for changing a frequency according to a voltage with an external input signal (reference frequency) by feeding back a phase difference between the external input signal (reference frequency) and the output signal of the VCO to the VCO.

Figure 11:
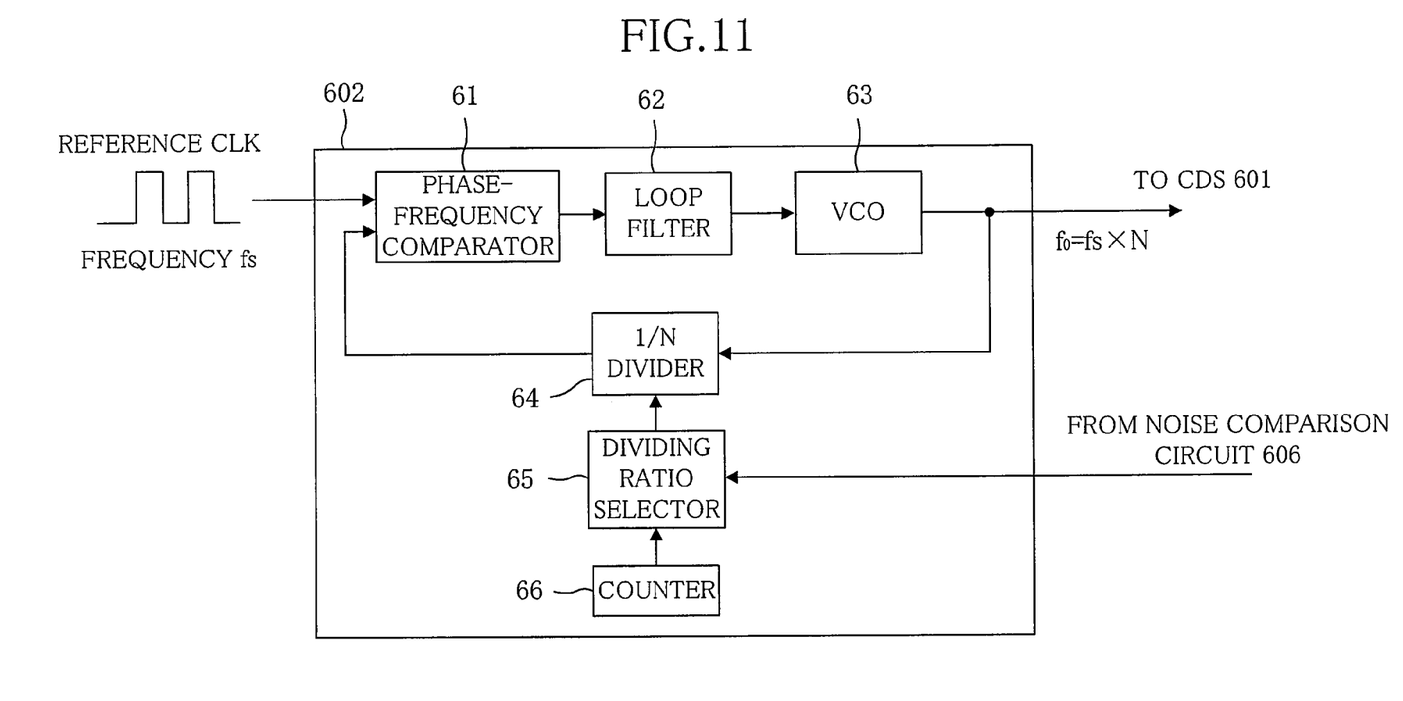
FIG. 11 shows a circuit structure of a clock control circuit.

FIG. 11 shows a circuit structure of the clock control circuit 602. In FIG. 11, 61 indicates a phase-frequency comparator for obtaining a phase difference between two signals and outputting a difference signal, 62 indicates a loop filter for removing an alternating current component, 63 indicates a VCO, 64 indicates a 1/N divider for dividing a frequency of an output of the VCO 63 to 1/N, 65 indicates a dividing ratio selector, and 66 is a counter.

The dividing ratio of the 1/N divider 64 is determined by an output value of a counter 66. More specifically, the dividing ratio is $N_0$ when the output value of the counter 66 is "0." The dividing ratio is $N_1$ when the output value of the counter 66 is "1." The sampling frequency $f_n$ is determined based on the diving ratio thus determined.

It is herein assumed that each sampling capacitor Cs is divided into two portions and the sampling frequency is changed twice. In this case, a 1-bit counter is used as the counter 66.

Based on an output signal from an invalid pixel region of an image sensor, the counter 66 in the clock control circuit 602 outputs "0" and sampling is performed at a predetermined sampling frequency ($f_0$). An output noise voltage is detected by a noise detection circuit 605 and the detected noise voltage is held in a storage register in a noise comparison circuit 606.

Figure 12:
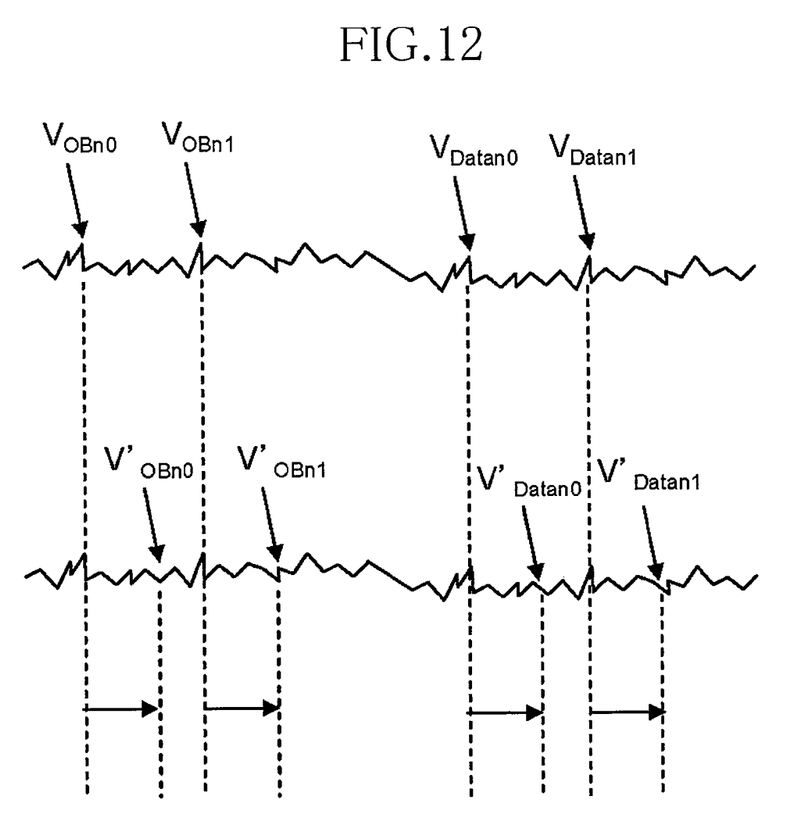
FIG. 12 shows an example of a sensor output signal with noise superimposed thereon.

Referring to FIG. 12, a detected noise voltage level $V_{noise}$ is shown by the following formula (5) based on the above formula (4), where $\Delta V_{OBn0}$ and $\Delta V_{OBn1}$ are noise voltages of a feed-through portion and $\Delta V_{Datan0}$ and $\Delta V_{Datan1}$ are noise voltages of a data portion at a sampling frequency $f_0$:

[Formula 5]

$$V_{noise}(f_0) = \frac{1}{2} \cdot \frac{C_s}{C_f} \cdot (\Delta V_{Data} - \Delta V_{OB}). \tag{5}$$

∗ $\Delta V_{Data} = \Delta V_{Data0} + \Delta V_{Data1}$
$\Delta V_{OB} = \Delta V_{OB0} + \Delta V_{OB1}$ The output value of the counter 66 then becomes "1" and the dividing ratio is switched to the value determined by the dividing ratio selector 65. A noise voltage $V_{noise}$ of a sampling frequency $f_1$ determined based on this dividing ratio is detected by the noise detection circuit 605 and held in the storage register in the noise comparison circuit 606. This noise voltage is shown by the following formula (6):

[Formula 6]

$$V_{noise}(f_1) = \frac{1}{2} \cdot \frac{C_s}{C_f} \cdot (\Delta V'_{Data} - \Delta V'_{OB}). \tag{6}$$

∗ $\Delta V'_{Data} = \Delta V'_{Data0} + \Delta V'_{Data1}$
$\Delta V'_{OB} = \Delta V'_{OB0} + \Delta V'_{OB1}$ Provided that $(\Delta V_{Data} - \Delta V_{OB}) > (\Delta V'_{Data} - \Delta V'_{OB})$, $V_{noise}(f_0) > V_{noise}(f_1)$. The noise comparison circuit 606 compares the two noise voltages and the dividing ratio selector 65 selects a dividing ratio corresponding to the sampling frequency of the smaller noise voltage.

A sensor output signal can be sampled at an optimal sampling point by thus changing the sampling frequency. Note that, in this embodiment, the sampling frequency is adjusted by using the PLL. However, the invention is not limited to this. The same result can be obtained by adjusting the phase relation at a fixed sampling frequency.

As has been described above, in the correlated double sampling circuit of the second embodiment of the invention, high frequency noise superimposed on an image sensor output signal can be reduced to 1/N while suppressing increase in circuit size and power consumption. This can be achieved by using a simple structure such as equally dividing each sampling capacitor into N portions and adding an averaging switch for obtaining an average value of a plurality of sampling values.

As shown in FIG. 6, by adding a clock circuit for variably controlling a sampling frequency 1/Ts for performing sampling at a plurality of sampling points, filter characteristics of the correlated double sampling circuit can be variably changed and a frequency band to be reduced can be variably changed.

A differential correlated double sampling circuit is described in the second embodiment. However, the invention is not limited to this and is also applicable to a single-ended correlated double sampling circuit.

INDUSTRIAL APPLICABILITY

As has been described above, the correlated double sampling circuit of the invention provides a highly practical effect of reducing a high frequency noise level superimposed on an input signal by equally dividing a sampling capacitor into N portions (where N is an integer of at least 2). Therefore, the invention is very useful and industrially highly applicable. The invention is especially useful for analog image signal processing circuits such as a mobile phone camera, a digital still camera, and a scanner.

What is claimed is:

1. A correlated double sampling circuit including a first input terminal, a second input terminal, a first output terminal, a second output terminal, a first feedback capacitor, a second feedback capacitor, a first sampling capacitor, a second sampling capacitor, and an operational amplifier, comprising:

the first sampling capacitor divided into a plurality of portions to sample a signal of a feed-through portion input to the first input terminal at a plurality of sampling points, the plurality of portions being connected in parallel with each other;

the second sampling capacitor divided into a plurality of portions to sample a signal of a data portion input to the second input terminal at a plurality of sampling points, the plurality of portions being connected in parallel with each other;

a plurality of sampling switches respectively connected in series with the plurality of portions of the first sampling capacitor;

a plurality of sampling switches respectively connected in series with the plurality of portions of the second sampling capacitor;

an averaging switch for calculating a first average value of a plurality of sampling values respectively obtained by sampling by the plurality of portions of the first sampling capacitor, and an averaging switch for calculating a second average value of a plurality of sampling values respectively obtained by sampling by the plurality of portions of the second sampling capacitor, wherein a difference between the first average value and the second average value is amplified using a value determined from a ratio of the first sampling capacitor, the second sampling capacitor, the first feedback capacitor, and the second feedback capacitor.

2. The correlated double sampling circuit according to claim 1, further comprising a clock circuit for variably controlling a sampling frequency for sampling at the plurality of sampling points.

3. The correlated double sampling circuit according to claim 2, further comprising:

a noise detection circuit for detecting a noise level of an output signal; and a noise comparison circuit for holding the noise level detected by the noise detection circuit and comparing the detected noise level with a noise level detected at a preset clock timing, wherein the clock circuit performs at least once a processing of adjusting a clocking timing to a clocking timing corresponding to a lowest one of the noise levels compared by the noise comparison circuit.

4. The correlated double sampling circuit according to claim 1, wherein the averaging switch connects one terminal of one of the plurality of portions, which are divided, to one terminal of another of the plurality of portions.

5. A correlated double sampling circuit, including a first input terminal, a second input terminal, a first output terminal, a second output terminal, a first feedback capacitor, a second feedback capacitor, a first sampling capacitor, a second sampling capacitor, and an operational amplifier, comprising:

the first sampling capacitor equally divided into N portions to sample a signal of a feed-through portion input to the first input terminal at a plurality of sampling points (where N is an integer of at least 2), the N portions being connected in parallel with each other;

the second sampling capacitor equally divided into N portions to sample a signal of a data portion input to the second input terminal sampling at a plurality of sampling points (where N is an integer of at least 2), the N portions being connected in parallel with each other;

N sampling switches respectively connected in series with the N portions of the first sampling capacitor;

N sampling switches respectively connected in series with the N portions of the second sampling capacitor;

an averaging switch for calculating a first average value of a plurality of sampling values respectively obtained by sampling by the N portions of the first sampling capacitor;

an averaging switch for calculating a second average value of a plurality of sampling values respectively obtained by sampling by the N portions of the second sampling capacitor, wherein a difference between the first average value and the second average value is amplified using a value determined from a ratio of the first sampling capacitor, the second sampling capacitor, the first feedback capacitor, and the second feedback capacitor.

6. The correlated double sampling circuit according to claim 5, further comprising a clock circuit for variably controlling a sampling frequency for sampling at the plurality of sampling points.

7. The correlated double sampling circuit according to claim 5, wherein the averaging switch connects one terminal of one of the N portions, which are equally divided, to one terminal of another of the N portions.

* * * * *